Figure 6:
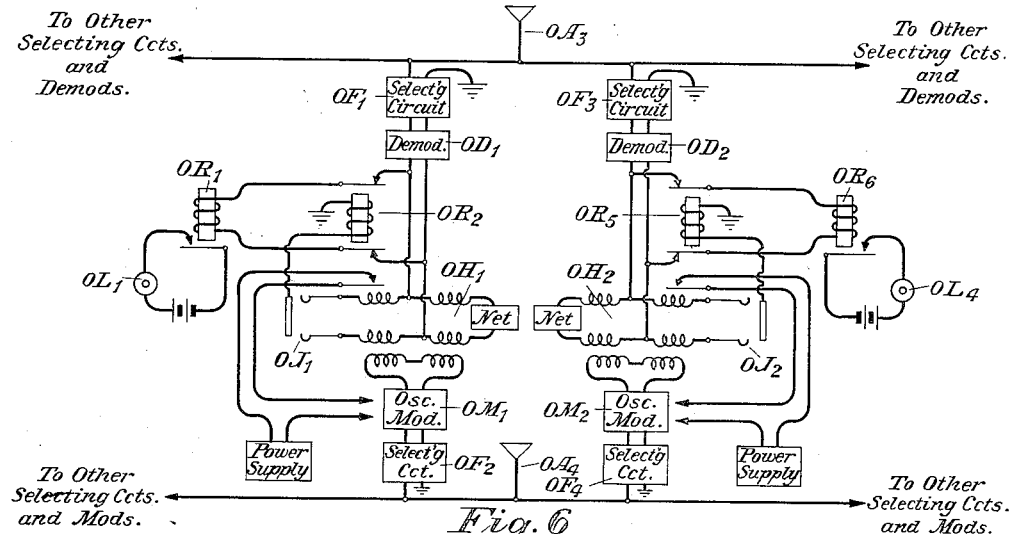

Dec. 22, 1936.                L. ESPENSCHIED                 2,064,894
                    COMMON MEDIUM MULTICHANNEL EXCHANGE SYSTEM
                         Filed May 26, 1934          5 Sheets-Sheet 1
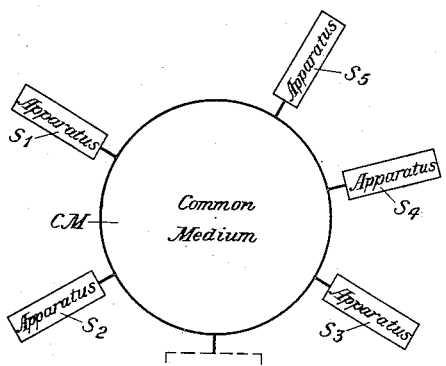
*Fig. 1*
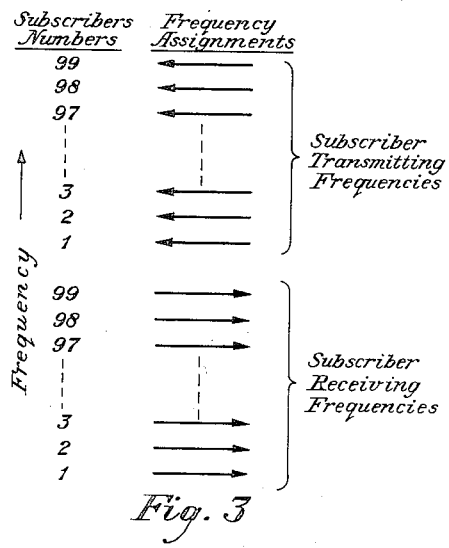
*Fig. 3*
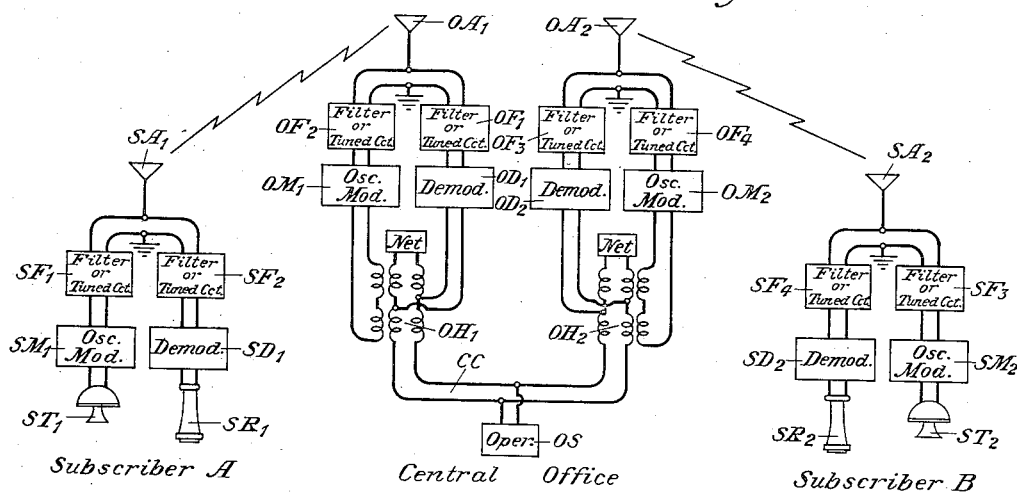
*Fig. 2*
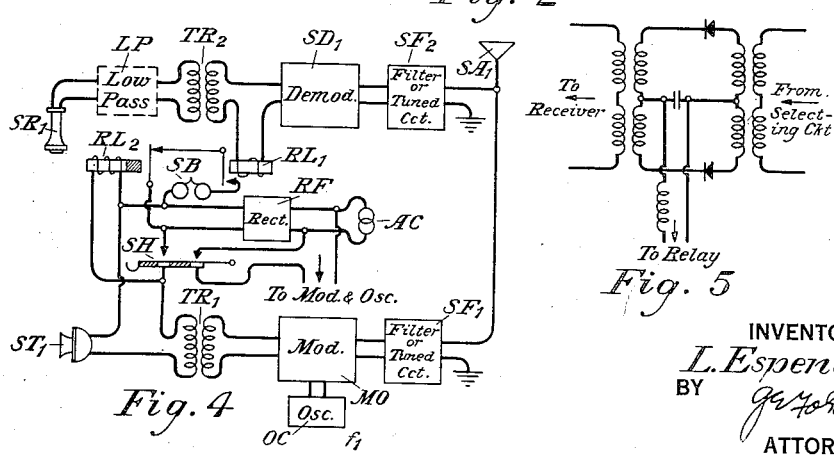
*Fig. 4*      *Fig. 5*
INVENTOR
L. Espenschied
BY
ATTORNEY Dec. 22, 1936.   L. ESPENSCHIED   2,064,894
COMMON MEDIUM MULTICHANNEL EXCHANGE SYSTEM
Filed May 26, 1934   5 Sheets-Sheet 2

INVENTOR
L. Espenschied
BY
ATTORNEY

Dec. 22, 1936.  L. ESPENSCHIED  2,064,894
COMMON MEDIUM MULTICHANNEL EXCHANGE SYSTEM
Filed May 26, 1934  5 Sheets-Sheet 3

INVENTOR
L. Espenschied
BY
ATTORNEY

Dec. 22, 1936.　　　L. ESPENSCHIED　　　2,064,894
COMMON MEDIUM MULTICHANNEL EXCHANGE SYSTEM
Filed May 26, 1934　　　5 Sheets-Sheet 4
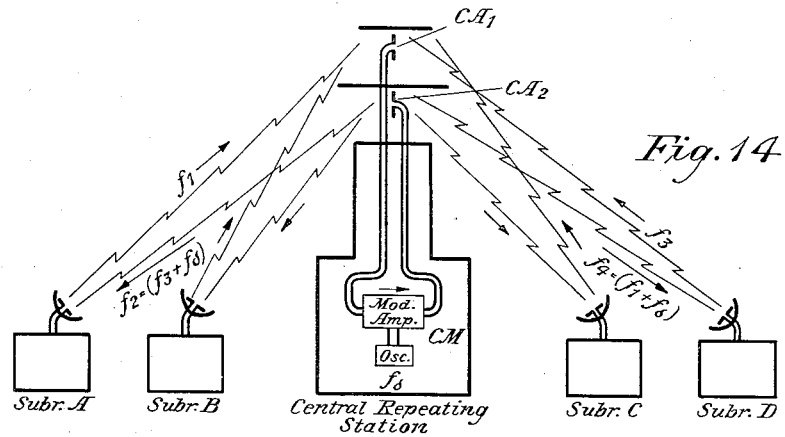
Fig. 14
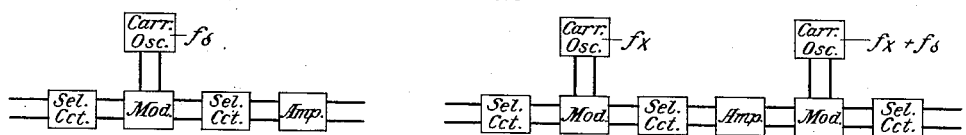
Fig. 15　　Fig. 16
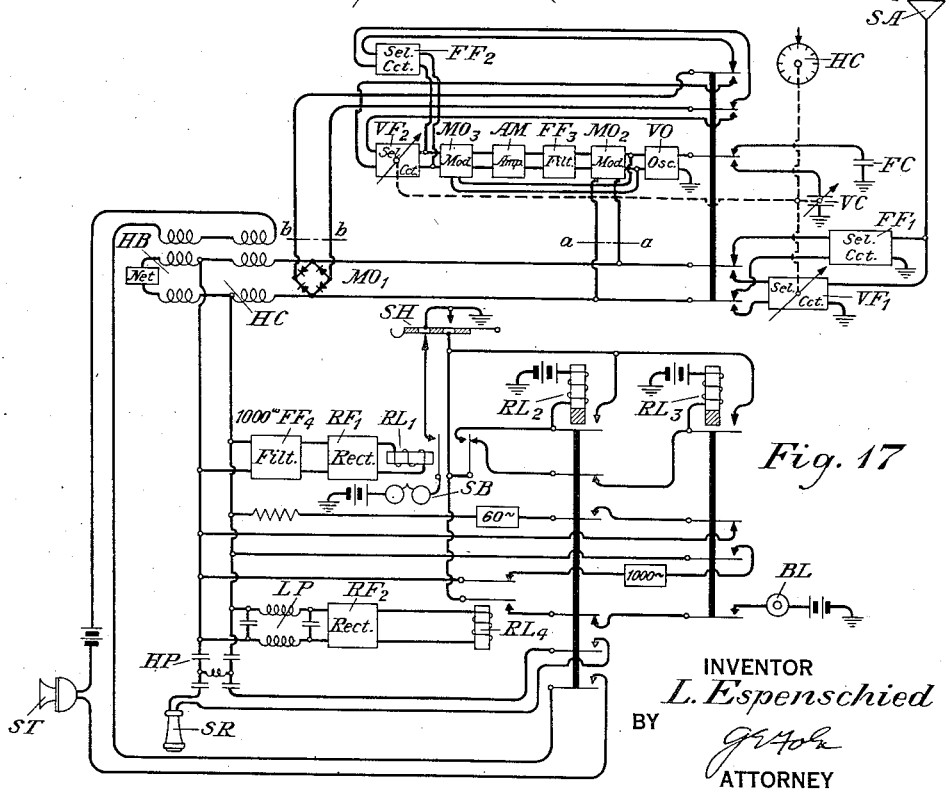
Fig. 17
INVENTOR
L. Espenschied
BY
ATTORNEY Dec. 22, 1936.  L. ESPENSCHIED  2,064,894
COMMON MEDIUM MULTICHANNEL EXCHANGE SYSTEM
Filed May 26, 1934  5 Sheets-Sheet 5

INVENTOR
L. Espenschied
BY
ATTORNEY

Patented Dec. 22, 1936

2,064,894

UNITED STATES PATENT OFFICE 2,064,894

COMMON MEDIUM MULTICHANNEL EXCHANGE SYSTEM

Lloyd Espenschied, Kew Gardens, N. Y., assignor to American Telephone and Telegraph Company, a corporation of New York Application May 26, 1934, Serial No. 727,807

2 Claims. (Cl. 250—6)

This invention has for its object the provision of an exchange system in which communication between subscribers is carried out over channels of different frequency derived from a common transmission medium. More particularly, the invention is designed to utilize as a substitute for the many subscriber pairs which are employed in the ordinary telephone exchange system the many channels which are obtainable in the high frequency art as it is now unfolding and to provide means whereby these channels may be selected by subscribers at will and employed for interconnection.

In the telephone exchange systems which have heretofore been provided it has been the practice to group subscribers in central office areas. Each subscriber is connected to his own central office by means of an individual wire circuit or by a party line arranged for non-simultaneous use by a few subscribers. When a subscriber desires to call another subscriber he utilizes his own line to the central office, and upon passing the desired number either to an operator or to an automatic switching mechanism is connected to another line which extends either directly or via another office or offices to the called party. For a system of this kind many thousands of subscriber circuits are necessary in each central office area. These are commonly provided in the form of a network of multiple pair cables extending over the area.

In accordance with the present invention it is proposed to substitute for such individual wire circuits extending to each subscriber a transmission medium which is common to all subscribers and which will accommodate a range of frequencies sufficiently wide for a large number of telephone channels. Interconnection between subscribers is then carried out over these high frequency channels.

The essence of the invention resides in making available to a large number of subscribers a transmission medium capable of accommodating a wide range of frequencies so that the subscribers may utilize, for the purposes of intercommunication, a plurality of signaling channels derived from the wide band medium. A transmission medium capable of handling the large number of channels required for the exchange system of the invention may be obtained by utilizing either radio transmission in space or high frequency transmission over a conducting or guiding medium.

This type of system is not known to have been heretofore invented, apparently because the necessary wide frequency spectrum which is required has not been available to the art either by radio or wire methods. A conception of the band width which is required may be had by assuming that there is taken as a unit a local exchange system of 1,000 subscribers and that each subscriber is allotted an individual channel of 10,000 cycles, making a total band width of some 10,000,000 cycles. Any such band width as this has not been available in the art until very recently.

In the case of radio, until the recent opening up of the ultra-high frequency (ultra-short wave) range, the art has not permitted the invention to be realized, for three reasons: First, there was not sufficient space in the frequency range, which until recently did not go beyond about 30 megacycles to accommodate this type of service along with all the other demands upon the radio spectrum; second, the characteristics of the waves vary widely through this spectrum (up to 30 megacycles) so that it is difficult to obtain a wide band having sufficiently uniform characteristics for the purpose; third, the waves in this range do not cut off very sharply with distance, and as a result their interfering effects extend to great distances, in many cases thousands of miles, making it impossible to operate a local service in one area without giving rise to interference in distant areas. With the opening of the ultra-high frequency range, frequencies above 30 megacycles (wave lengths below about 10 meters), an entirely new prospect is presented, making it for the first time physically possible to set up by radio the system comprising the invention. Of course, this is not saying that the system will either prove to be desirable or economical for actual operation. This will not be known until a great deal of development work is done and the general art is much further advanced.

It will be appreciated also that the invention has not been feasible heretofore as a wire proposition because it has not been possible until very recently to transmit over wire circuits for considerable distances frequency bands greater than some tens of thousands or, at most, hundreds of thousands of cycles. The transmission of bands of some millions of cycles as required by the invention has become possible by wire methods only recently through the development of radically new types of wire systems, as exemplified by the coaxial conductor type of line, as described in U. S. Patent No. 1,835,031 to L. Espenschied and H. A. Affel. These new wire systems are characterized by the provision of means for quite completely shielding the transmission path from outside disturbances. This is done in the coaxial circuit by the outer conductor which serves both as a shield and one of the line conductors. By virtue of the skin effect at these very high frequencies, the desired transmission is confined to the inner surface of the tube and interference originating from without is confined to the outer surface. Thus, the shielded type of circuit permits of blocking off a wide frequency band for the purposes of the invention and subjecting the transmitting medium to full control in respect to the exclusion of interference, the prevention of overhearing on the part of outsiders and the general knitting together of the system as a self-contained unit. In other words, in this wire embodiment of the invention there are retained the advantages of wire transmission, plus the advantage of radio in respect to the availability of a wide frequency spectrum.

In general, these recent developments, whereby the frequency range of radio and of wire transmission is being greatly extended, are the basis of the present invention. The extension of the frequency range is so great as to amount to the imparting to the art of a new dimension of development, the frequency dimension, whereby it becomes possible to derive large numbers of telephone channels and to handle them as a group. Thus, there are obtained on a frequency basis large numbers of identical channels comparable to the large number of physical circuits which are obtained in the local telephone plant in the familiar telephone cables.

Considering, first, the use of radio as the medium for transmitting the wide band of frequencies contemplated by the invention, the invention is designed to employ whatever part of the frequency range may be available. As has been pointed out, the radio frequency spectrum has, until recently, scarcely afforded sufficient frequency space to yield the channel capacity required for a local telephone exchange system. With the opening up of the field of ultra-short waves this limitation as to channel capacity is removed. Thus, for example, between one and two meters there is a total frequency range of 150 megacycles while the range between 10 and 20 centimeters is 1500 megacycles. The frequency ranges obtainable through the use of still shorter waves are far greater.

With these ultra-high frequencies, however, nature imposes another limitation, i. e., the tendency of the waves to take on quasi-optical characteristics, so that they project only in straight lines and do not bend around corners to any considerable extent. Thus, it becomes necessary that subscribers utilizing such waves have a fairly clear line of sight between their antennas. Some diffraction around obstacles may, of course, be obtained, but, in general, reasonably clear line-of-sight projection without intervening obstacles appears to be called for. This, of course, has the advantage of making it possible to utilize the same ultra-high frequencies in different areas.

The line-of-sight characteristics of the ultrashort waves must be recognized in the design of a telephone exchange system utilizing this technique. In one form of the invention it is proposed to provide in the center of a community a repeating station with antennas mounted sufficiently high above the surrounding buildings to make possible the necessary directness of transmission between these antennas and practically any point in the territory to be served. One subscriber's station is then placed in connection with another by transmitting first to the central repeating station and having the repeating station repeat the transmission to the desired other subscriber located in another part of the community. The central repeating station acts as a means for catching the waves from one subscriber at a relatively high point and transmitting them down again to a second subscriber, thus lifting the transmission path above any obstacles lying between the subscribers' antennas.

In order that such a repeating station may be economical, it is proposed to make it capable of handling simultaneously a wide band of frequencies such as would accommodate hundreds or perhaps thousands of channels. The particular arrangement of the repeating station will be hereinafter described.

As an alternative to the use of a radio transmission medium, the invention contemplates the employment of a guiding or conducting transmission path suitable for the required band of frequencies. Such a transmission path would be provided in the form of a network, extending to all the subscribers within a given area. Conceivably, such a network might be composed of ordinary wire circuits branched and interconnected so as to make the common circuit available to each subscriber. Thus, the wire network might be somewhat similar to the network employed for distributing light and power currents, except that a simple two-wire network without multiphase connections, voltage transformation arrangements, etc., would suffice. It would, however, be possible to carry out the invention by employing the light and power network itself and this is contemplated within the scope of the invention.

The preferred form of guiding transmission medium, however, is one which is designed for the transmission of a wide band of frequencies with comparatively low attenuation and preferably also with shielding to minimize the effect of external disturbances. Such a transmission medium may be found in a circuit consisting of two conductors disposed coaxially with respect to one another. In a properly designed coaxial circuit, as will be hereinafter explained, low attenuation at high frequencies may be attained by the employment of conductors of suitably low high frequency resistance and the use of a substantially gaseous dielectric between the conductors. With this type of circuit the outer conductor serves also as a shield whose protective effect becomes more nearly perfect as the frequency is increased, so that at high frequencies practically complete immunity from external disturbances may be obtained.

The invention contemplates also as an alternative to the coaxial circuit a high frequency transmission medium comprising a circuit consisting of two conductors surrounded by a shield. Here, again, the high frequency attenuation may be minimized by proper design with substantially gaseous insulation and the thickness of shield may be determined so as to minimize interference from external disturbances.

Yet another form of transmission medium suitable for carrying out the invention is a dielectric wave guide comprising a cylindriform dielectric material which may or may not be surrounded by a conductor. An advantageous form of such a transmission path is a hollow cylindrical conductor containing air or some other gas as the dielectric. This type of circuit is particularly adapted to transmit waves of very high frequencies, for example, of the order of a few centimeters or less in wave length.

Using any of the above types of transmission media, the interconnection of subscribers at will from the available channels involves a number of new and difficult problems which are solved by the various features of the invention as hereinafter disclosed.

It is contemplated that the subscribers may be interconnected over the available channels either (1) at a central office or (2) directly.

Connection at the central office may be effected either (a) in much the same way as is now done by deriving out the channels into physical circuits which may be switched to one another, or (b) by interconnecting the channels at the central office at carrier frequencies, employing for this purpose a suitable modulating frequency. The central office connection may be effected manually or automatically.

Direct connection between subscribers is effected by a process of tuning or selection. This method takes advantage of the fact that the transmission medium is common to all of the subscribers, with all of the channels accessible to each subscriber at will. The switching function is placed in the hands of the individual subscribers by eliminating the central office in so far as connections within the given area are concerned. Connection to subscribers in other areas is carried out through the respective central offices which are joined by trunk channels or circuits suitable for the purpose.

One of the big functions involved in local exchange telephone systems is that of switching so that each subscriber is connected with any other subscriber. This operation is now carried out at the central offices by the switching of mechanical contacts either as a manual operation or by automatic equipment under remote control of the subscriber. Actually a great many of these contacts are involved and there is a considerable hazard in poor contacts giving rise to microphonic noises in subscribers' lines. Also, the making and breaking of contacts gives rise to surges of currents in these lines due to the presence of direct current with consequent noises and clicks.

Thus, an important object of the invention is the provision of means whereby mechanical switching may be replaced by "electrical switching". This electrical switching or interlinking is carried out by shifting the tuning of the circuits, by selecting the frequency of the carrier current, by shifting the frequencies in a modulator, or a combination of these. Selecting, modulating and multiplexing methods are, therefore, important features of the invention.

Another object is a local exchange system which permits of individual paths to be employed for transmission in the two directions between subscribers, thus avoiding the balance difficulties which arise when local subscribers' lines are connected with long toll lines.

A further object is to provide telephone subscribers' apparatus which operates at high frequencies, thus enabling the use of carrier current transmission.

In general, the invention contemplates the assignment to each subscriber of a particular frequency or frequencies which might preferably be related to his telephone number. The assignment of frequencies should be such as to facilitate the interconnection of subscribers and various schemes of frequency allocation are provided in the invention for this purpose. One feature of the invention is the supplying from a central point of the carrier frequencies required at the subscribers' stations.

Figure 7:
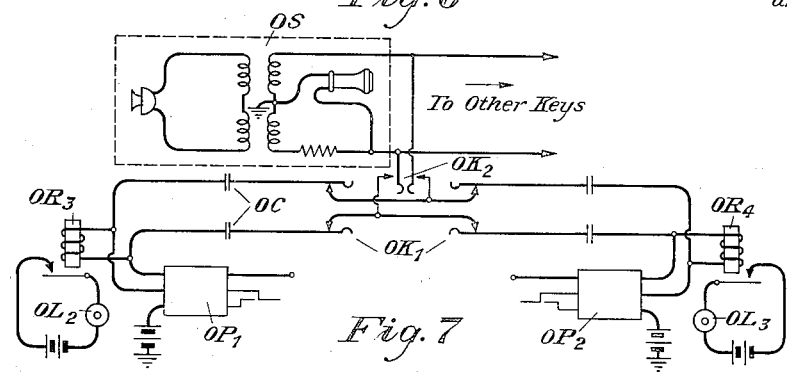
Figure 8:
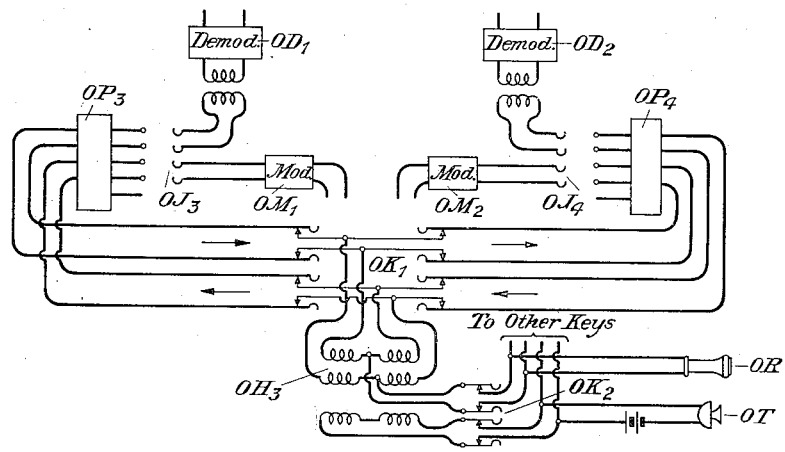
Figure 9:
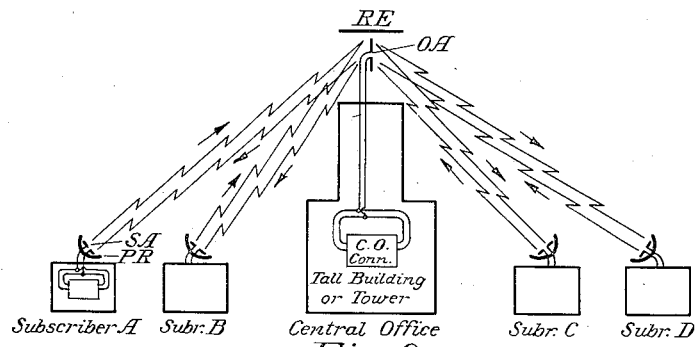
Figure 10:
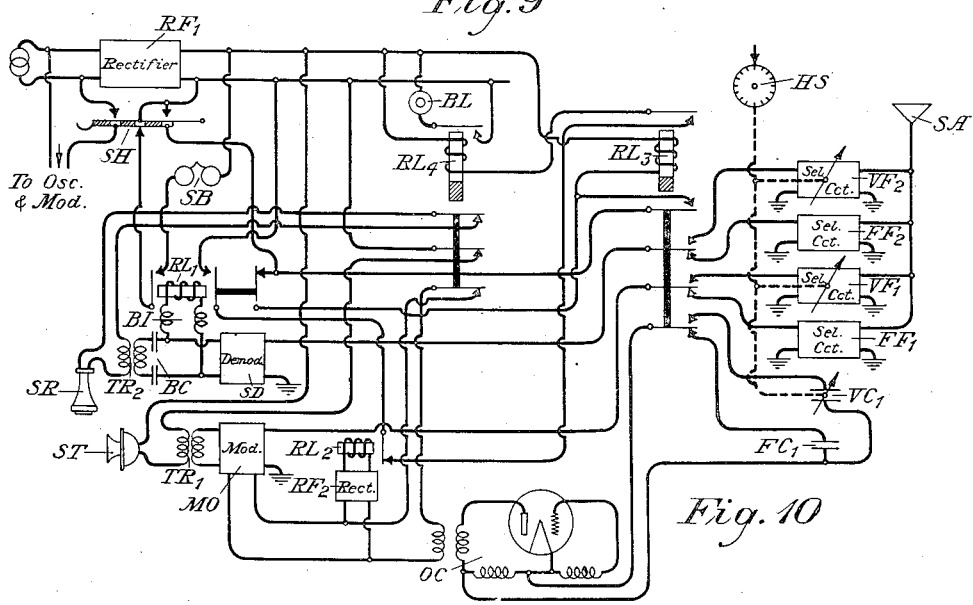
Figures 11, 12:
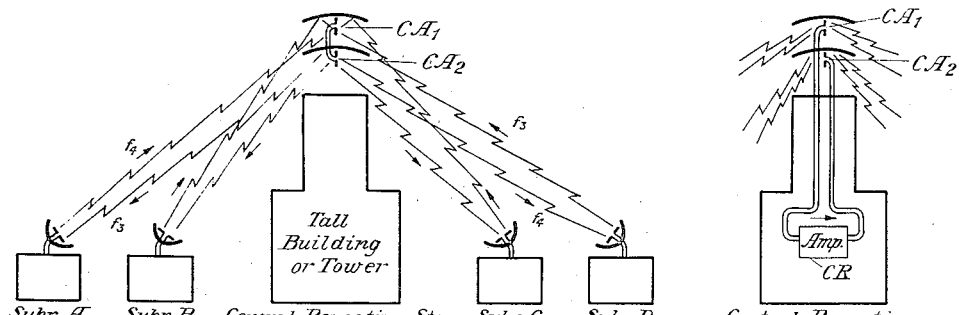
Figure 13:
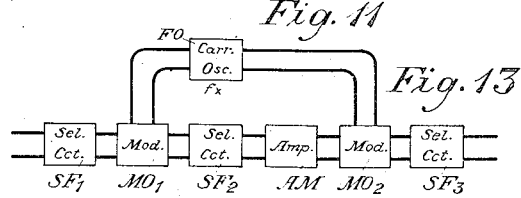
Figure 20:
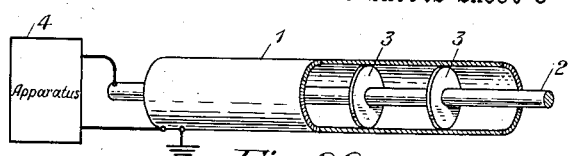
Figure 21:
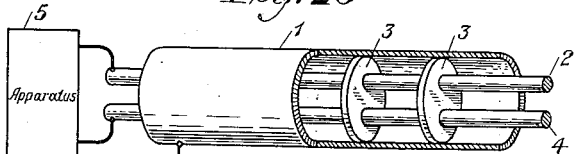
Figure 22:
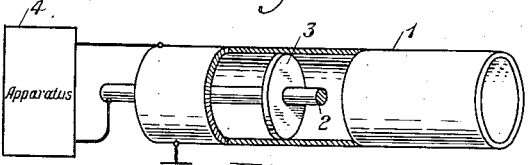
Figure 18:
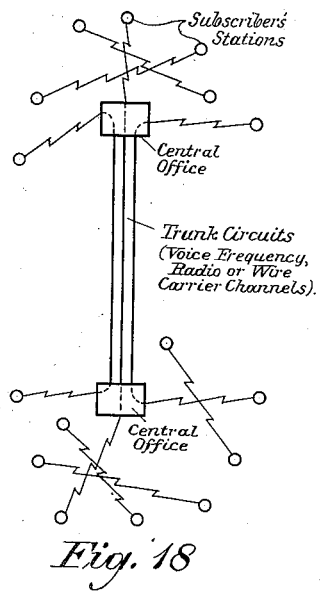
Figure 19:
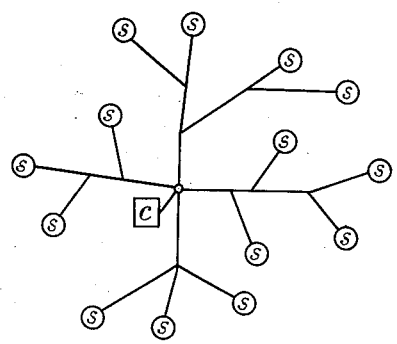
Figure 24:
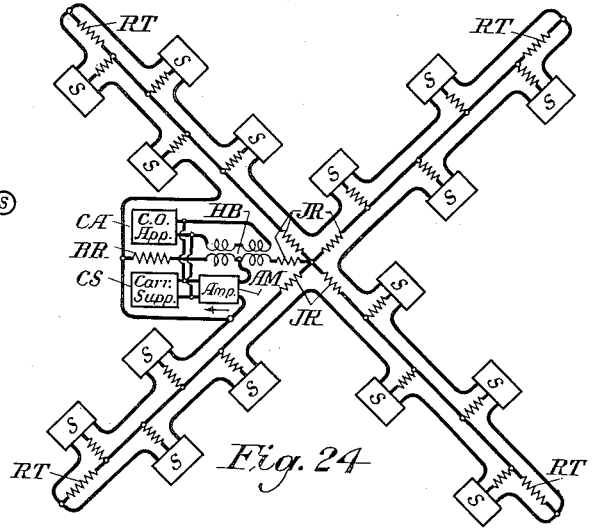
Figure 23:
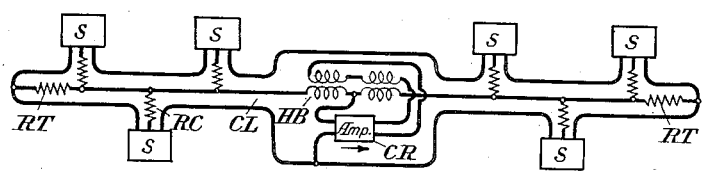

The foregoing outline having indicated some of the principles of the invention as well as a few of its major objects, the complete invention with its various details, features and purposes will now be understood from the following description when read in connection with the accompanying drawings, in which Figure 1 shows a schematic representation of the principal idea of the invention wherein a large number of stations are connected to a common transmission medium; Fig. 2 shows, in schematic form, a system for connecting subscribers through a central office using space radio transmission; Fig. 3 shows one possible allocation of frequencies for a multichannel exchange system; Fig. 4 shows a subscriber station arrangement which may be used in the system of Fig. 2; Fig. 5 shows a modulating device which may be used in various applications of the invention; Figs. 6 and 7 in combination show a central office arrangement which may be used in association with the subscriber station arrangement of Fig. 4; Fig. 8 shows a cord circuit arrangement alternative to that of Fig. 7; Fig. 9 shows an antenna arrangement for use in a system in which subscribers are interconnected at a central office; Fig. 10 shows an arrangement of subscribers' apparatus for direct interconnection without the assistance of a central station; Fig. 11 shows an antenna arrangement which may be used with subscriber stations of the type shown in Fig. 10; Fig. 12 shows an arrangement in which signals transmitted between subscribers are amplified at a central repeating station; Fig. 13 shows one possible method of arranging the amplifier system at the central station; Fig. 14 shows an arrangement in which subscribers are connected through a central repeating station which provides both amplification and frequency shift of the incoming signals; Figs. 15 and 16 show alternative arrangements for obtaining the amplification and frequency shift for a system of Fig. 14; Fig. 17 shows an arrangement in which communication is established between subscribers using the same frequency band for both directions of transmission, and having the carrier frequencies supplied from a central station; Fig. 18 is a schematic diagram indicating how connections may be established directly between subscribers in the same area, while connections between subscribers in different areas are completed through central offices over trunk circuits; Fig. 19 is a schematic diagram of a guiding or conducting network which is available in common to a central station and a number of subscribers; Figs. 20, 21, and 22 show different forms of transmission paths which may be used to form a transmission medium common to a number of subscribers; Fig. 23 shows an arrangement for providing central amplification in a network extending to a number of subscribers, and Fig. 24 shows a modification of Fig. 23 in which a number of subscriber stations may communicate with one another or with a central station over a common transmission network, the central station providing amplification as well as a common source of carrier frequencies.

Referring to Fig. 1, there is illustrated one of the principal aspects of the invention. In this figure is shown a common medium CM, to which are connected a plurality of stations $S_1$, $S_2$, $S_3$, each of which includes transmitting, receiving and associated apparatus. This apparatus, which will be hereinafter described, is arranged to permit intercommunication between different pairs of stations over the common medium CM employing different frequency bands to permit simultaneous communication between different pairs of stations. Connection between any pair of stations may take place directly between the two stations as, for example, $S_1$ and $S_3$, or it may take place through the common central station CS which is shown in dotted lines in the figure.

Fig. 2 shows in schematic form a telephone exchange system in which a number of subscribers may be interconnected through a central office, the connection between each subscriber and the central office being accomplished by radio transmission through space. Each subscriber is provided with transmitting apparatus including an oscillator-modulator and receiving apparatus including a demodulator, together with the necessary selecting circuits. At the central office a plurality of circuits such as the one shown are provided for interconnecting between subscribers. Each connecting circuit includes two separate sets of apparatus, each of which comprises a radio transmitter and receiver, and a connection, to which the operator has access, between the two sets of apparatus.

Transmission from subscriber A to subscriber B is effected by means of the transmitter $ST_1$, the oscillator-modulator $SM_1$, the tuned circuit or filter $SF_1$, the antenna $SA_1$, the antenna $OA_1$, the tuned circuit or filter $OF_1$, the demodulator $OD_1$, the hybrid coil $OH_1$, the connecting circuit CC (across which is bridged the operator's set OS), the hybrid coil $OH_2$, the oscillator-modulator $OM_2$, the tuned circuit or filter $OF_4$, the antenna $OA_2$, the antenna $SA_2$, the tuned circuit or filter $SF_4$, the demodulator $SD_2$ and the receiver $SR_2$. Transmission in the opposite direction is accomplished in an analogous manner, employing the transmitter $ST_2$, the oscillator-modulator $SM_2$, the selecting circuit $SF_3$, the antenna $SA_2$, the antenna $OA_2$, the selecting circuit $OF_3$, the demodulator $OD_2$, the hybrid coil $OH_2$, the connecting circuit CC, the hybrid coil $OH_1$, the oscillator-modulator $OM_1$, the selecting circuit $OF_2$, the antenna $OA_1$, the antenna $SA_1$, the selecting circuit $SF_2$, the demodulator $SD_1$ and the receiver $SR_1$.

It is proposed that different frequencies be employed for the oppositely directed transmissions in Fig. 2 and that the frequencies employed between the calling subscriber and the central office be different from those used between the central office and the called subscriber. Transmission might be on either a double or a single sideband basis with the carrier frequency transmitted.

In order that simultaneous conversations may take place between a number of pairs of subscribers, it is necessary that the frequencies employed in the system of Fig. 2 be properly selected. One way of arranging the frequencies would be to assign to each subscriber a separate pair of frequencies, one for transmitting and one for receiving, and to provide apparatus at the central office for receiving and transmitting the various required frequencies. Thus, subscriber A might be assigned a transmitting frequency $f_1$ and a receiving frequency $f_2$, and subscriber B transmitting and receiving frequencies $f_3$ and $f_4$, respectively. This would mean that in Fig. 2 the modulators $SM_1$ and $SM_2$ would operate with carrier frequencies $f_1$ and $f_3$, respectively, and the modulators $OM_1$ and $OM_2$ with carrier frequencies $f_2$ and $f_4$, respectively.

With such a scheme it might prove desirable, in order to facilitate the allocation of frequencies and the interconnecting of subscribers, to have a constant difference between the transmitting and receiving frequencies of each subscriber or, in other words, to make $$f_1 - f_2 = f_3 - f_4 = D \qquad (1)$$

The frequencies $f_1$, $f_3$, etc., might then be grouped in one part of the frequency spectrum and the frequencies $f_2$, $f_4$, etc., in another part. A diagram of a frequency allocation of this sort, assuming a total of 99 subscribers, is given in Fig. 3. It will be noted that the order of the frequency assignments corresponds to that of the subscriber numbers. This scheme, while not essential to all embodiments of the invention, is a very desirable feature in many.

Detailed arrangements of apparatus which might be used at the subscriber's station and at the central office in a scheme of this sort are illustrated in Figs. 4 and 6. While some of the apparatus shown in this and succeeding figures is more particularly adapted to radio frequencies lying below the ultra-short wave range, it will be understood that such apparatus is shown merely to illustrate the principles of the invention, and is not intended in any way to limit its scope.

The operation of the subscriber's apparatus illustrated in Fig. 4 is as follows: When the subscriber desires to make a call, the receiver $SR_1$ is removed from the switchhook SH. Through the contacts of the switchhook this closes a circuit which furnishes power supply to operate the oscillator and modulator OC and MO. The operation of the switchhook also provides D. C. supply for the transmitter $ST_1$, this supply being derived through a rectifier RF which is connected to the A. C. supply. The speech currents produced in the transmitter, after passing through the transformer $TR_1$, are modulated upon the assigned frequency, here assumed to be $f_1$. The oscillator and modulator may be separate units of any desired types, or a self-oscillating modulator might be used. The carrier and sidebands in the modulator output, after passing through the selecting circuit $SF_1$, are radiated by the antenna $SA_1$ to the central office. When communication with the central office is established in a manner hereinafter to be described, the number of the called subscriber is passed orally to the operator and after the proper arrangements are set up at the central office, communication is established with the called subscriber who is provided with apparatus identical with that of Fig. 4 except for the frequency assignments used.

In the case of an incoming call, the carrier frequency $f_2$ and its associated sidebands are received by the antenna $SA_1$, selected by the selecting circuit $SF_2$ and demodulated by the demodulator $SD_1$. This demodulator may be of the vacuum tube type, in which case it should be kept always in operating condition so that a call may be received. Preferably, however, the demodulator might comprise some passive element or elements, as for example, copper-oxide units as shown in Fig. 5. Associated with the demodulator is a relay $RL_1$ which is operated by the rectified current resulting from the incoming carrier frequency and which in turn operates the call bell SB. When the subscriber answers the call, the switchhook SH is operated, which in addition to completing the contacts previously mentioned, operates the slow-release relay RL2, which breaks the circuit of the bell SB. The received voice frequency currents, after passing through the transformer TR2, are applied to the receiver SR1 and two-way communication is thus established. If desired, a low pass filter LP (shown dotted in Fig. 4) may be included in the receiver circuit to suppress unwanted high frequency components in the demodulator output. It will be understood that a similar filter may be provided in the arrangements hereinafter described. When the subscriber hangs up, the slow-release feature of RL2 prevents his bell from ringing before the other party also hangs up.

It will be appreciated in connection with Fig. 4 and subsequent figures that other known methods of modulation and demodulation may be employed. Particularly, direct modulation and demodulation whereby the modulation process takes place in the electro-acoustical device itself are contemplated within the scope of the invention. An example of this method of modulation using a carbon transmitter may be found in chapter VIII, Fig. 1 of "Principles of Radio Communication" by J. H. Morecroft. A condenser transmitter may be similarly employed as a modulator.

Figs. 6 and 7 illustrate central office apparatus which may be used in conjunction with the subscribers' apparatus shown in Fig. 4. In the arrangement of Fig. 6 a number of selecting circuits OF1, OF3, etc., corresponding to the transmitted frequencies of the different subscribers is connected to a common antenna OA3. The total number of such selecting circuits is equal to the total number of subscribers to be served in the area. Similarly, selecting circuits OF2, OF4, etc., which correspond to the receiving frequencies assigned to the various subscribers are connected to the antenna OA4. If desired, the two antennas might be replaced by a single antenna, or the transmitting and receiving apparatus might be grouped in other ways for connection to antennas.

The operation of the apparatus in Figs. 6 and 7 is as follows: The incoming carrier frequency of a calling subscriber is received on the antenna OA3, selected by one of the selecting circuits, for example OF1, and demodulated by the demodulator OD1. Associated with the demodulator is a relay OR1 whose winding is connected to the demodulator output through the contacts of another relay OR2. The rectified current resulting from the incoming carrier frequency operates the line relay OR1, which in turn lights the line lamp OL1, thereby calling the attention of the operator to the incoming call.

The operator is provided with a number of cord circuits of the type shown in Fig. 7, each cord circuit terminating in plugs, such as OP1 and OP2. Upon observing the line lamp she inserts the plug OP1 associated with one of the cord circuits into the jack OJ1 of the calling subscriber and operates the key OK2. Thus, the voice frequency currents delivered by the demodulator, after passing through the hybrid coil OH1, reach the operator's set OS. The sleeve connection of the plug operates the relay OR2 which extinguishes the line lamp OL1, and connects power supply to the oscillator-modulator OM1. The insertion of the plug operates the supervisory relay OR3, which lights the supervisory lamp OL2. This lamp remains lit as long as the calling subscriber has his receiver off the hook. The condensers OC in the cord circuit serve to interrupt the d. c. path, so that line and supervisory relays and lamps may be similarly operated at the other side of the connection.

To the conjugate terminals of the hybrid coil OH1 there are connected the oscillator-modulator OM1 and the selecting circuit OF2 so that the operator may answer the incoming call. The subscriber then passes the number of the called party to the operator. A "busy test" of the called subscriber's line is obtained through the tip of the plug at the other end of the cord circuit and the sleeve of the subscriber's jack. In case another cord circuit is already connected to a jack corresponding to the number of the called party, the sleeve of the jack will have battery connected to it and a click will be produced in the operator's receiver.

If the called subscriber's "line" is not busy, the operator places the plug OP2 in a jack such as OJ2 of Fig. 6 of the called party, thereby completing the connection. The operation of the relay OR5 connects power supply to the oscillator-modulator OM2, so that the carrier is transmitted and the bell of the called party rings. When the called party answers, the supervisory lamp OL3 is lighted by means of relay OR4 and remains lighted until the called party hangs up. The conversation then proceeds with the apparatus functioning in a manner similar to that described in connection with Fig. 2. When the conversation is completed, the lamps OL2 and OL3 are extinguished as the subscribers hang up, and the operator takes down the connection. By means of keys, such as OK2, the operator may connect her set to different cord circuits, and using the key OK1 she may split the connection and talk to either subscriber without the other.

It will be noted that the cord circuit connection between the two subscribers in Fig. 7 is arranged on a two-wire basis. If desired, this connection might be made instead on a four-wire basis, using, for example, the arrangement shown in Fig. 8. In this case the plugs OP3 and OP4 each establish four contacts in addition to that of the sleeve, and the jacks OJ3 and OJ4 are substituted for the jack and hybrid coil combinations of Fig. 6. The oppositely directed paths of the connection are brought through the splitting key OK1. The operator may talk to either or both subscribers by means of the key OK1 and the hybrid coil OH3 which is connected through the key OK2 to the operator's transmitter and receiver OT and OR. The connections of the line and supervisory lamps and relays and other minor details are now shown in Fig. 8, it being understood that their operation will be generally similar to that described in Figs. 6 and 7.

It will be understood in connection with the arrangements of Figs. 6, 7, and 8 that any desired amount of amplification of the signals may be included in the central office connection.

It will be obvious also that other arrangements including automatic switching methods similar to those well known in the art may be utilized for the interconnection of subscribers through a central office and over a common transmission medium. Such arrangements are intended to be included within the scope of the invention.

It is contemplated in accordance with the invention that subscribers' stations shall be associated in the same central office area with other subscribers' stations either of the same or other types and that all such subscribers' stations shall be interconnected through the central station. In general, such interconnection can be effected by appropriate types of connecting circuits.

The invention further contemplates that subscribers' stations of the type described shall be located in different central office areas and interconnected both with one another and with other types of stations. The trunk circuits to be used for interconnection between central offices may be designed for either manual or automatic operation and may consist either of ordinary voice-frequency circuits or of high frequency channels derived from radio systems or guided wave transmission systems such as carrier systems. A type of automatic high frequency interoffice trunk adapted for such use is disclosed in U. S. Patent No. 1,619,228 to S. B. Williams, Jr., et al. Other suitable types of trunks are well known in the art.

In the various arrangements shown radio transmission between the subscribers and the central office may be accomplished directly using any suitable type of antenna. However, in order to permit the use of ultra-short waves, for which substantially line-of-sight projection may be desired, it may be necessary to carry the transmission path above any obstacles lying between the antennas of individual subscribers. For this purpose an arrangement of the type shown in Fig. 9 might be employed.

Referring to Fig. 9, it will be seen that in this case a single central office antenna OA serves for receiving all frequencies from subscribers and transmitting all frequencies to subscribers. This antenna may be mounted on a tall building or tower so that substantially a line-of-sight transmission path is obtained between the central office and each subscriber's antenna within the central office area. The subscriber's antenna should preferably be designed for radiating a beam toward the central office antenna and for receiving radiation from that antenna. Thus the subscriber's antenna might be a balanced doublet SA as shown in Fig. 9, placed near the focus of a parabolic reflecting surface, PR, directed toward the central office antenna OA. The central office antenna, however, is designed for radiating to and receiving from all subscribers. For this purpose there might be employed an antenna capable of radiating in all directions and receiving radiations from all directions throughout the range of frequencies utilized. Such an antenna, for example, might be a balanced doublet OA as shown in Fig. 9. Another possibility would be to employ a central office antenna so designed that it is capable of radiating into and receiving from a conical space which comprehends all subscribers' locations. This might be accomplished by adding the reflector RE above the doublet antenna OA. The line-of-sight propagation characteristics of ultra short waves make it practicable to use in each of two distinct areas the same frequency band for the interconnection of subscribers entirely within one of those areas; and by such methods as disclosed herein in connection with Fig. 18, a subscriber in one such area may be interconnected with a subscriber in the other area.

It is also contemplated that instead of employing a single central office antenna a multiple antenna arrangement might be used at the central office building, each antenna being designed for handling a part of the total range of frequencies. It would also be possible to employ two antennas for each susbcriber instead of one.

The arrangements thus far described have been designed for the interconnection of subscribers through a central office. There will now be described arrangements whereby subscribers may be connected with one another by a direct radio path, without the assistance of a central connecting station.

One possible arrangement of this kind is illustrated in Fig. 10, the apparatus for one subscriber's station being shown diagrammatically in this figure. It is assumed in this case that one pair of frequencies is assigned to each subscriber for incoming calls and that in placing a call, a subscriber adjusts the frequencies of his station apparatus to the frequencies assigned to the called party.

The operation of the arrangement shown in Fig. 10 is as follows: In making an outgoing call the subscriber first adjusts the hand switch HS to the number of the called party. This switch may be of various types as discussed later, and may comprise several switches rather than a single one. The adjustment of HS mechanically adjusts the mid-band frequencies of the variable selecting circuits $VF_1$ and $VF_2$ to the receiving and transmitting frequencies, respectively, of the called party, and also adjusts the variable condenser $VC_1$ to a value such that the frequency of the oscillator OC corresponds to the receiving frequency of the called party.

Having set up the number of the called party, the subscriber removes the receiver SR from the switchhook SH. The operation of the switchhook provides power supply for the oscillator and modulator OC and MO. In addition, the operation of the switchhook energizes the slow-release relay $RL_3$ whose winding is connected to the D. C. supply through a back contact of the relay $RL_1$ and a make contact of the switchhook. (At the time the switchhook is removed the relay $RL_1$ in the demodulator circuit is deenergized since the demodulator is connected to the fixed selecting circuit $FF_2$, which is used for incoming calls.) The relay $RL_3$ in pulling up establishes for itself a new circuit leading direct through one of its make contacts to the switchhook contact and thence to the D. C. supply. The relay $RL_3$ remains operated until the calling subscriber hangs up at the end of the conversation.

The operation of $RL_3$ connects the modulator MO to the variable selecting circuit $VF_1$, the demodulator SD to the variable selecting circuit $VF_2$, and the oscillator tuned circuit to the variable condenser $VC_1$. If at this time the transmitting frequency of the called party is busy, this frequency will be passed by the selecting circuit $VF_2$ and rectified in the demodulator SD, so that the relay $RL_1$ will be operated. This in turn will energize the relay $RL_4$, which is connected through a make contact of $RL_3$, a back contact of $RL_2$ (which may be a slow-operating relay or may be delayed in operating due to the time required for the oscillator to become operative) and the make contact of $RL_1$ to the D. C. supply. The operation of $RL_4$ will serve to light the busy lamp BL, thereby indicating to the subscriber that the number of the called party is busy.

If the called party's number is not busy, the relays $RL_1$ and $RL_4$ will not become operated and the carrier supply from the oscillator OC will be connected to the modulator MO and the rectifier $RF_2$ through a back contact of $RL_4$. The current from the rectifier $RF_2$ will operate the relay $RL_2$, thereby opening the circuit of RL4. The transmitter ST will be connected to the D. C. supply through a back contact of RL4 and the circuit of the receiver SR will be completed through another back contact of RL4.

The receiving frequency of the called party, which is sent out by the oscillator OC, will ring the bell at the called station (in a manner to be described later). When the called party answers, his transmitting carrier frequency will be received by the demodulator SD and the relay RL1 will be operated, but this will not affect the other circuit connections. The circuit is then in readiness for the two subscribers to proceed with their conversation. When the calling subscriber hangs up, his equipment returns to the condition for receiving an incoming call.

The operation of the arrangement of Fig. 10 in receiving an incoming call will now be described. The demodulator SD, if composed of a passive element or elements, will be continuously in operative condition. If a demodulator of the vacuum tube type is employed the tubes should be supplied with power continuously or at least during the period when it is desired to receive calls.

When the subscriber's receiver is on the switchhook the relay RL3 is deenergized. The demodulator SD is connected through a back contact of this relay to the fixed selecting circuit FF2 so that the incoming call may be received. The modulator MO is connected through a back contact of RL3 to the fixed selecting circuit FF1, while the oscillator is properly adjusted to the subscriber's outgoing frequency assignment by the fixed condenser FC1.

The rectified current produced by the incoming carrier frequency operates the relay RL1, closing the circuit of the bell SB which is connected through one of the contacts of the switchhook. When the subscriber answers the call, the bell circuit is broken by the switchhook. At the same time the power supply is connected to the oscillator and modulator through a contact of the switchhook and carrier supply is brought from the oscillator to the modulator through a back contact of RL4 (which is deenergized). The transmitter receives battery supply through a back contact of RL4, while the receiver circuit is completed through another back contact of RL4. The apparatus is therefore in condition for conversation with the calling party. At the conclusion of the conversation the subscriber hangs up and the apparatus is in readiness for the next call.

Radio transmission between subscribers who are provided with station arrangements of the types shown in Fig. 10 may be accomplished directly, using any suitable type of antenna. However, in order to obtain substantially line-of-sight transmission for the ultra-short range of frequencies, the transmission path may be carried over obstacles which intervene between the antennas of individual subscribers by employing an arrangement of the type shown in Fig. 11.

Referring to this figure, the frequencies transmitted by the various subscribers are carried through a central repeating station where they are received on the antenna CA1 and rearadiated from the antenna CA2. These antennas CA1 and CA2 may be located upon a tall building or some other place having sufficient elevation. The antenna CA1 is designed to receive from all subscribers' antennas within the assigned area while the antenna CA2 is of a type suitable for radiating to all subscribers' antennas. Each subscriber's antenna may be designed to radiate a beam toward the antenna CA1 and to receive radiation from the antenna CA2.

In considering the application of the arrangement in Fig. 11 to the subscriber's system of Fig. 10, let it be assumed that subscriber A, for example, wishes to call subscriber D. The frequencies assigned to subscriber D may be assumed to be $f_3$ for transmitting and $f_4$ for receiving. Accordingly, subscriber A adjusts his apparatus to employ $f_4$ as the transmitting frequency and $f_3$ as the receiving frequency.

If the antennas of Fig. 11 are so designed that a sufficiently small portion of the energy radiated by CA2 is picked up in CA1, it is possible to amplify the energy at the central station prior to reradiation. An arrangement for this purpose is shown in Fig. 12. Only the central station is indicated in the figure, the remainder of the system being the same as in Fig. 11. The amplifier CR should be designed to amplify all the frequencies employed in the system. The signals may be amplified directly at radio frequencies or they may be brought to some other frequency range in order to facilitate amplification. Fig. 13 shows an arrangement using the latter method, this arrangement being intended to replace CR of Fig. 12. In Fig. 13 the incoming signals, after being selected by SF1, are modulated in MO1 by the carrier $f_x$ (from the oscillator FO) to a frequency range where the desired amount of amplification may be obtained in the amplifier AM. The signals are returned to their original frequency position by a second modulator MO2 and passed through the selecting circuit SF3 to the transmitting antenna.

In order to permit the use of greater amplification than may be obtained when the frequencies radiated by CA2 are the same as those received by CA1, the central amplifier might be designed to introduce a constant frequency shift so that all frequencies radiated by CA2 would differ by a constant amount from the corresponding frequencies received by CA1. An arrangement for this purpose is illustrated schematically in Fig. 14. The modulator-amplifier CM of Fig. 14 may comprise either the apparatus unit shown in Fig. 15 or those of Fig. 16. Fig. 15 shows the incoming frequencies modulated by the difference carrier frequency $f\delta$ and amplified prior to reradiation. In Fig. 16 the incoming frequencies are shifted to a frequency range where they may be readily amplified and are then modulated with a carrier so as to produce the desired amount of shift from the original frequency.

In using the arrangement of Fig. 14 in connection with the subscriber system of Fig. 10, the frequency assignments might be worked out as follows: Assume that subscriber A wishes to call subscriber D whose transmitting and receiving frequencies are $f_3$ and $f_4$, respectively. Assume further that the modulator-amplifier CM raises all frequencies received on CA1 by the frequency $f\delta$. Subscriber A will then adjust his transmitting frequency to value $f_4-f\delta$ and his receiving frequency to a value $f_3+f\delta$.

All of the subscriber's arrangements which have been described thus far have been designed to employ different frequencies for transmitting and receiving. The invention contemplates also, however, the use of subscriber equipment in which the same carrier frequency is employed both to transmit and to receive.

When the same frequency is employed for both directions of transmission, there may be some difficulty in obtaining sufficiently close synchronism between the frequencies used by the two subscribers. Accordingly, it may be desirable in this case for both subscribers to obtain the carrier frequency from a common source. It is proposed that this common source be a central station from which there are radiated continuously the frequencies required by the various subscribers. Each subscriber will then select from the frequencies received by his antenna the particular one which he desires to use both for modulation and demodulation. Since the received energy may be small, it may be found desirable to amplify the carrier before applying it to the modulator. An arrangement of this kind is illustrated in Fig. 17, which is a diagrammatic representation of one possible arrangement of subscriber equipment, wherein the same carrier frequency is used for both directions of transmission. In accordance with this arrangement it is proposed that a single carrier frequency be assigned to each subscriber for use on incoming calls and that in placing an outgoing call the subscriber will select the frequency assigned to the called party.

Referring to Fig. 17, the carrier frequency to be used by the subscriber is selected either by the fixed selecting circuit $FF_1$ or by the variable selecting circuit $VF_1$ and led via an auxiliary path to the modulator $MO_2$. This modulator is supplied with a local carrier frequency by the oscillator VO. The value of the locally supplied frequency is so determined that the beat frequency produced between it and the incoming carrier corresponds with the pass frequency of the sharp selecting filter $FF_3$. In the output of this filter the beat frequency is amplified by the amplifier AM and applied to the modulator $MO_3$ which is supplied also with the frequency from the oscillator VO. Accordingly, there is obtained in the output of the modulator $MO_3$ an amplified carrier of precisely the same frequency as that received. This frequency is selected by selecting circuit $FF_2$ or $VF_2$, as the case may be, the unwanted products of modulation being rejected, and the carrier is then applied to the two-way modulator $MO_1$. This modulator, being of the balanced type, does not permit the carrier to pass back to the input of the modulator $MO_2$, so that singing is prevented.

The operation of the arrangement of Fig. 17 in receiving an incoming call will first be described. In this case, the output of the fixed selecting circuit $FF_1$ (which is tuned to the frequency assigned to the subscriber) is connected to the two-way modulator $MO_1$ which serves to modulate both the outgoing signals and the incoming signals. The output of the selecting circuit $FF_1$ is applied also to the modulator $MO_2$. The frequency of the oscillator VO is at this time determined by the fixed condenser FC and is of such value as to combine with the carrier selected by $FF_1$ to produce the beat frequency which passes $FF_3$. The amplified intermediate frequency is remodulated to obtain the original carrier, $FF_2$ being adjusted to the same frequency as $FF_1$. The amplified carrier is delivered to $MO_1$ which is associated with the hybrid coil HC to which the transmitter ST and the receiver SR are conjugately connected, the latter through the high pass filter HP.

As will be explained later, the equipment of the calling subscriber will at this time have modulated the carrier frequency with a ringing frequency of 1000 cycles. This ringing frequency, being demodulated by $MO_1$, passes through the 1000-cycle filter $FF_4$ and, after rectification in the rectifier $RF_1$, serves to energize the relay $RL_1$. This relay closes the circuit of the bell SB which is connected through the break contact of the switchhook SH.

The subscriber answers the call by taking his receiver off the hook, which breaks the circuit of the bell. The make contact of the switchhook also completes a circuit through the winding of the slow-release relay $RL_2$ and a make contact of $RL_1$. Thus $RL_2$ is operated, whereupon it forms for itself a locking circuit through one of its make contacts and the make contact of the switchhook, so that $RL_2$ remains operated until the switchhook contact is broken. The operation of $RL_2$ serves to disable the relay $RL_3$ so that the connections to the fixed selecting circuits $FF_1$ and $FF_2$ and the condenser FC remain unchanged. The operation of $RL_2$ also serves to connect 60-cycle current through a back contact of $RL_3$ to the hybrid coil, whence it passes to the modulator $MO_1$. At the other subscriber's station this 60-cycle current is demodulated and used to cut off the 1000-cycle ringing current in a manner to be explained below. The frequency of 60 cycles is continuously applied to the modulator throughout the connection, and serves as a "busy indicator" in the manner hereinafter explained. $RL_2$ acts also to complete the circuit of the transmitted ST and the receiver SR. Thus, the equipment is in readiness for the conversation to proceed. At the conclusion of the conversation the subscriber hangs up, whereupon his equipment restores to normal.

The operation of the arrangement of Fig. 17 when the subscriber places an outgoing call will now be explained. First, the subscriber, by means of the control HC, adjusts the frequencies of the variable selecting circuits $VF_1$ and $VF_2$ to the frequency of the called party. At the same time the frequency of the oscillator VO is adjusted (by means of the variable condenser VC) so that the beat between this frequency and the frequency of the called party passes the fixed filter $FF_3$. Thus the equipment is in readiness to amplify the carrier frequency of the called subscriber, although the circuit connections at this time are still established with the fixed selecting circuits $FF_1$ and $FF_3$ and the condenser FC which are employed for receiving an incoming call.

The subscriber now takes his receiver off the hook. Since there is no incoming call, the received carrier is not modulated by 1000 cycles and the relay $RL_1$ is deenergized. Accordingly, a circuit is completed through slow-release relay $RL_3$, which is connected through a back contact of $RL_2$, a back contact of $RL_1$, and the make contact of the switchhook. Thus $RL_3$ is operated, whereupon it forms for itself a locking circuit through one of its make contacts and the make contact of the switchhook. The operation of $RL_3$ establishes the connections to the variable selecting circuits $VF_1$ and $VF_2$ and the variable condenser VC.

If at this time the frequency of the called party is in use, this frequency will be modulated by 60 cycles, as has been explained above. In this case the 60-cycle current, after being demodulated by $MO_1$, will pass through the low pass filter LP and, upon being rectified in $RF_2$, will energize the relay $RL_4$. This will serve to light the busy lamp BL which is connected through a make contact of $RL_3$, a break contact of RL₂, the make contact of RL₄, and the make contact of the switchhook. The subscriber may then hang up or wait until the called subscriber's frequency becomes idle.

If, at the time RL₃ operates, the called subscriber's frequency is not busy, the operation of RL₃ serves to apply to the hybrid coil HB the ringing frequency of 1000 cycles, the connection being carried through a back contact of RL₄. The 1000-cycle frequency passes through the filter FF₄ and after rectification energizes the relay RL₁ which, in turn, completes the circuit of RL₂. In the modulator MO₁ the ringing frequency is modulated to produce side frequencies of the called party's carried. At the called station these side frequencies are demodulated and the resultant 1000-cycle current applies a frequency of 60 cycles to the modulator of the called subscriber. The modulated frequencies corresponding to 60 cycles which are sent out from the called station are demodulated by MO₁ and serve to energize the relay RL₄ which cuts off the 1000-cycle ringing current. Since the operation of RL₂ has completed the circuits of the transmitter ST and the receiver SR, the equipment is now in readiness for conversation. At the conclusion of the conversation, the operation of the switchhook causes the equipment to restore to normal.

One or two further points in connection with the arrangement of Fig. 17 may now be noted. The antenna arrangements employed at the subscribers' stations and the central station may be similar to those which have been shown in figures already described. The transmission from one subscriber to another may be accomplished either directly or via the antenna of the central station, the original source of carrier frequency being the central station. In case the carrier frequency is received by the subscriber at a sufficiently high level, it may be found possible to use this frequency unamplified for demodulation, modulation and reradiation, so that the auxiliary circuit for amplifying the incoming carrier frequency might be omitted.

As has been explained, the subscriber station arrangements of Figs. 10 and 17 are designed to provide a direct radio connection between the subscribers within a given area. It is proposed to interconnect such stations with subscriber stations in other areas by providing in each area a central office, so that a radio connection may be established between a subscriber and his central office, using a frequency or frequencies assigned for that purpose, and the connection completed over suitable interoffice trunks. The method is illustrated schematically in Fig. 18. The central office apparatus to be used in carrying out this method might be patterned after that shown in previous figures. The types of trunks which may be used to interconnect the central offices are well known in the art.

In the subscriber station arrangements described prior to Fig. 17, it may be found desirable to derive all carrier frequencies from a central source, in order to secure greater economy or greater frequency stability than is possible with a number of individual sources. It will be understood that this centralized method of supply is contemplated within the scope of the invention. This method makes it possible to omit from the subscriber equipment the local oscillator and the mechanism for controlling its frequency. In case the carrier is received from the central point at a level too low for use in modulation and retransmission, an auxiliary amplifying circuit similar to that of Fig. 17 may be employed.

In the arrangements which have been described for selecting channels at subscriber stations and central offices, the entire selection has been accomplished at the channel frequency. It will be evident that this method of selection might be replaced by the well known superheterodyne method, with partial selectivity provided at the channel frequency and the remaining selectivity furnished by a sharp, intermediate frequency selecting circuit or filter.

It will be evident to those skilled in the art that arrangements for automatically controlling the volume of the signals delivered by the subscriber's equipment may be incorporated in any of the subscribers' station arrangements which have been described, so that conversation between different subscribers may take place over a substantially constant transmission equivalent.

It will be noted that, in all of the subscriber station arrangements described above, the apparatus is designed to prevent a subscriber from listening in on the conversations of other subscribers. This, of course, is a very desirable feature for a telephone exchange system.

In all of the arrangements thus far described it has been assumed that free space is employed as the common transmitting medium. There will now be described arrangements in which transmission over a high frequency conducting or guiding path is employed instead of radio transmission. Such a path would take the form of a network extending to all subscribers within a given area and to the central office for that area.

Probably the simplest form of such a network would be one composed of ordinary two-conductor circuits suitably interconnected and branched so that the common circuit will be available at all desired points. The circuits composing the network might, for example, consist of pairs of open wire or cable conductors. A network of this kind is shown schematically in Fig. 19, where each line represents a pair of conductors, C designates the central office and S a subscriber's station.

It is contemplated also in accordance with the invention that the wire network employed for distributing light and power currents might be used as the common medium from which to derive high frequency channels for the telephone exchange system. The high frequency channels would be superposed upon the power network by carrier methods which are well known in the art.

Another form of transmission medium, and one which is peculiarly advantageous in that it is capable of transmitting a wide band of frequencies with comparatively low attenuation and which may be so shielded as to be practically immune to external disturbances, may be found in a circuit consisting of two conductors disposed coaxially with respect to one another. Such a circuit has been disclosed in the patents to L. Espenschied and H. A. Affel, No. 1,835,031, December 8, 1931; H. A. Affel and E. I. Green, No. 1,781,092, November 11, 1930, etc. In this form of circuit, low attenuation at high frequencies may be obtained by the employment of conductors whose high frequency resistance is suitably small and by the employment of a substantially gaseous dielectric. The outer conductor provides shielding against external disturbances, which shielding becomes more nearly perfect as the frequency is increased, so that at high frequencies the noise due to thermal agitation in the conductors becomes the factor which determines the minimum transmission level. A diagram of one form of coaxial circuit is given in Fig. 20, where 1 designates an outer cylindrical conductor and 2 a conducting wire or tube concentric therewith. The two conductors are maintained in proper spaced relationship by the insulating disks 3. The circuit is shown connected to apparatus 4.

As an alternative to the coaxial circuit, the high frequency transmission medium might comprise a network of circuits, each consisting of two parallel conductors surrounded by a shield. Circuits of this type are disclosed in the patents to Green, Curtis and Mead, No. 2,034,032; Green and Curtis, No. 2,034,033; and Green and Leibe, No. 2,034,034, all granted March 17, 1936. One form of such a shielded pair is illustrated in Fig. 21, where 1 designates a conducting shield and 2 and 4 represent conductors located on opposite sides of and equidistant from the axis of the shield. These conductors are held in proper spaced relation to one another and the shield by means of insulating disks 3. The conductors 2 and 4 may be connected to apparatus 5. In a circuit of this type it is desirable to employ conductors of suitable size, with as far as possible gaseous insulation, in order to minimize the high frequency resistance and capacitance and thereby reduce the high frequency attenuation. The thickness of shield, moreover, should be such as to minimize external disturbances.

The invention contemplates also utilizing as the high frequency transmission medium a dielectric wave guide comprising a cylindriform dielectric material which may or may not be surrounded by a conductor. Such dielectric guides are disclosed in the patent applications of G. C. Southworth, Serial No. 661,154, filed March 16, 1933, and Serial No. 701,711, filed December 9, 1933. An advantageous form of such a wave guide is a hollow cylindrical conductor containing air or some other gas as the dielectric. This type of circuit is particularly adapted to transmit waves of very high frequencies, for example, of the order of a few centimeters or less in wave length. Fig. 22 shows one form of such a wave guide. Apparatus 4 produces high frequency signaling currents which are propagated along the coaxial circuit comprising the tube 1 and the conductor 2, separated from one another by insulating disks 3, as shown in the cut-away portion of the tube. If the frequency is sufficiently high, the conductor 2 need continue only a short distance inside the tube 1, and the electromagnetic waves from the apparatus 4 travel along conductors 1 and 2 and will continue along the tube 1 where the inner conductor has been removed, transmission taking place on the inner surface of the tube and the enclosed dielectric. A similar device may be used at the other end of the dielectric wave guide to receive the signals.

It is contemplated in accordance with the invention that any of the subscriber set and central office arrangements which have been described may be employed with any of the above types of transmission paths. For this purpose, it is necessary merely to substitute the transmission network for the radio path, replacing the connection of the apparatus to the radio antenna by a connection suitable to the type of medium employed.

In general, the connections between subscribers when using network guides may be effected either directly or via the central office, just as in the case of radio. When using a network such as that of Fig. 19 for a system in which connections are established through the central office, there might be some advantage in so allocating the frequencies that the outermost subscribers utilize the lower frequencies for which the attenuations are smaller, while the close-in subscribers utilize higher frequencies which undergo higher attenuations.

A conducting network, in addition to being capable of use with the various arrangements which are adapted also to radio use, makes it possible to employ certain schemes which are not feasible in the case of radio. Thus the existence of a definite transmission network permits the use of balancing methods to separate opposite directions of transmission. Suppose, for example, that it is desired in a system in which transmission takes place directly between subscribers to amplify the transmission between subscribers at a central point. It will be recalled that in the radio case such amplification was accomplished by the method of Figs. 12 or 13. In the case of the conducting network it is possible to amplify without shifting frequencies by means of an arrangement such as that of Fig. 23.

Referring to Fig. 23, a number of subscriber equipments S are each connected to a coaxial line circuit CL through a resistance RC which is preferably large in comparison with the high frequency characteristic impedance of the line circuit. This line circuit is terminated at each end by means of a resistance RT which is substantially equal to the high frequency characteristic impedance. It is well known that the characteristic impedance of a circuit at high frequencies is substantially independent of frequency and approaches a pure resistance of value $$\frac{L}{C}$$

where L is the linear inductance and C the linear capacitance of the circuit. Reflection effects which would result in standing waves on the circuit are avoided by the terminations and the high impedance connections to the subscribers' sets. At an intermediate point in the circuit there is inserted the hybrid coil HB, to the conjugate terminals of which are connected the input and output of the amplifier CR which is designed to amplify a broad band of frequencies. Thus the signals transmitted by any one subscriber are amplified at the central point and passed on to the other subscriber.

Fig. 24 shows a modification of Fig. 23 wherein coaxial lines extend in several directions from the central point. Each line is terminated in a resistance RT which approximates its characteristic impedance. At the central point each of the inner conductors of the various branches is brought through a resistance JR to a common junction point. The function of the resistance JR is to avoid high frequency reflections which otherwise would be produced at the junction. The method of proportioning these resistances will be hereinafter explained. The hybrid coil HB is shown connected to the common junction through a resistance JR, though it would be possible to omit this resistance if a suitable value were assigned to the others. The opposite side of the hybrid is terminated in a resistance BR which is equal to the parallel impedance of all the branches. The various transmissions arriving at the central point are amplified by the amplifier AM and retransmitted.

In addition, the carrier frequencies required by the subscriber are supplied from the source CS at the central point. Thus Fig. 24 might be used in conjunction with the subscriber station arrangement of Fig. 17, the antenna connection of Fig. 17 being replaced by a connection to the coaxial line. It would also be possible to omit the auxiliary circuit shown in Fig. 17 (between lines a—a and b—b), for amplifying the carrier. The arrangement of Fig. 24, including the provision of a common carrier frequency supply, may be used also with the other subscriber station arrangements hereinbefore described in which different carrier frequencies are employed for opposite directions of transmission. The central office apparatus for communication with subscribers is shown at CA in Fig. 24. In case amplification at the central station is not required, the carrier source CS and the apparatus CA may be connected direct to the line junction.

While the preceding discussion has been restricted to systems wherein a common transmission medium is employed for the provision of telephone exchange service between subscribers, it will be understood that the invention contemplates the use of the same general methods for other types of communication. In particular, it will be seen that there has been disclosed a medium which is capable of handling a wide band of frequencies from which a substantial number of television channels may be derived.

It will furthermore be obvious that the general principles herein disclosed may be embodied in many other organizations widely different from those illustrated without departing from the spirit of the invention as defined in the following claims.

What is claimed is:

1. A system for radio communication between any of a plurality of subscribers' radio stations arranged so that any station may be put in two-way radio communication with any other station and so that a plurality of such two-way communications may take place simultaneously, said system including means at each of said subscribers' stations for transmitting and receiving radio signals, and at some point an adjusted material reflecting system capable of reflecting simultaneously signals from any of said subscribers' stations to any other of said subscribers' stations.

2. In a system for telephone communication between any one and any other of a group of subscribers' stations employing radio transmission and arranged in a central office area, an antenna system at said central office, said antenna system being located so as to provide an unobstructed line-of-sight path between itself and all of said subscribers' stations, a reflector associated with said antenna system arranged to direct the transmissions from said central office toward all of said subscribers' stations and to concentrate upon said antenna system the transmission received from all of said subscribers' stations, means whereby any subscriber's station may be put in two-way radio communication with any other subscriber's station to the exclusion of all other subscribers' stations of the group, and means whereby a number of such two-way communications may be carried on at the same time through said antenna system without interference.

LLOYD ESPENSCHIED.